Figure 1:
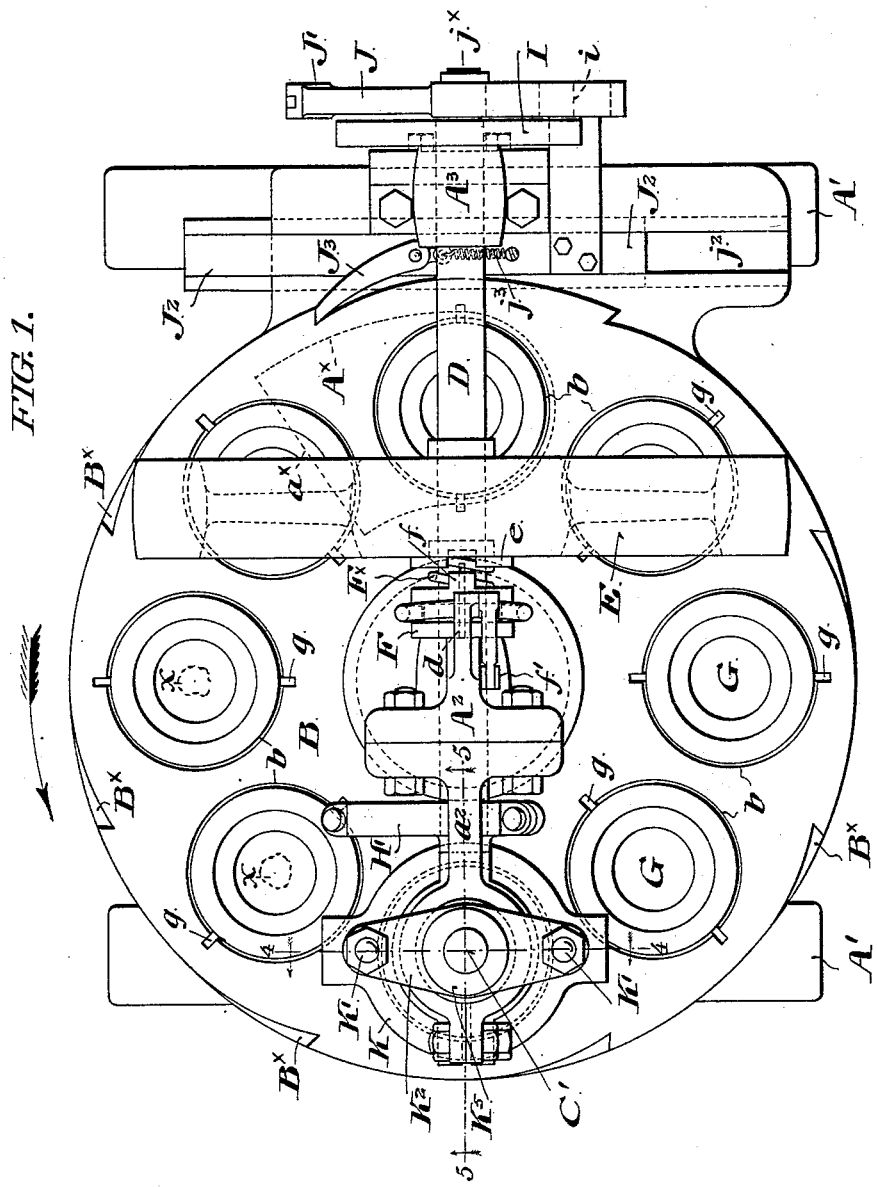

(No Model.)　　　　　　　　　　　　　　　5 Sheets—Sheet 1.
W. FETTERS.
GLASS PRESSING MACHINE.

No. 602,636.　　　　　　　　　　Patented Apr. 19, 1898.

WITNESSES:　　　　　　　　　　　　　　INVENTOR:
E. L. Fullerton　　　　　　　　　　　　WILBUR FETTERS,
F. C. Morley　　　　　　　　　　　　By A. E. Paige, Atty.

(No Model.)  5 Sheets—Sheet 2.

W. FETTERS.
GLASS PRESSING MACHINE.

No. 602,636. Patented Apr. 19, 1898.

WITNESSES:
E. L. Fullerton
F. C. Morley

INVENTOR:
WILBUR FETTERS,
By A. E. Paugh Atty

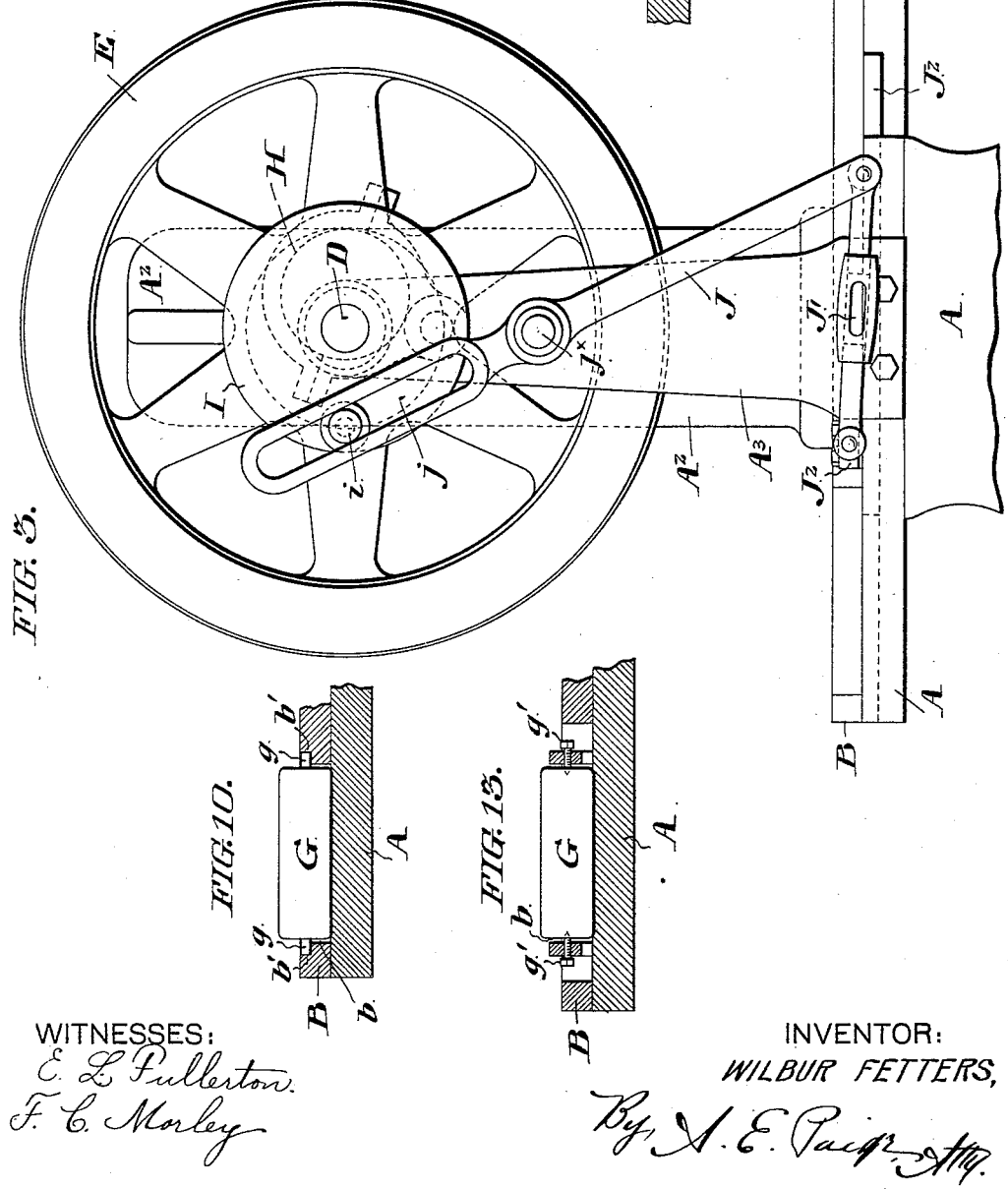

(No Model.) 5 Sheets—Sheet 4.
W. FETTERS.
GLASS PRESSING MACHINE.
No. 602,636. Patented Apr. 19, 1898.
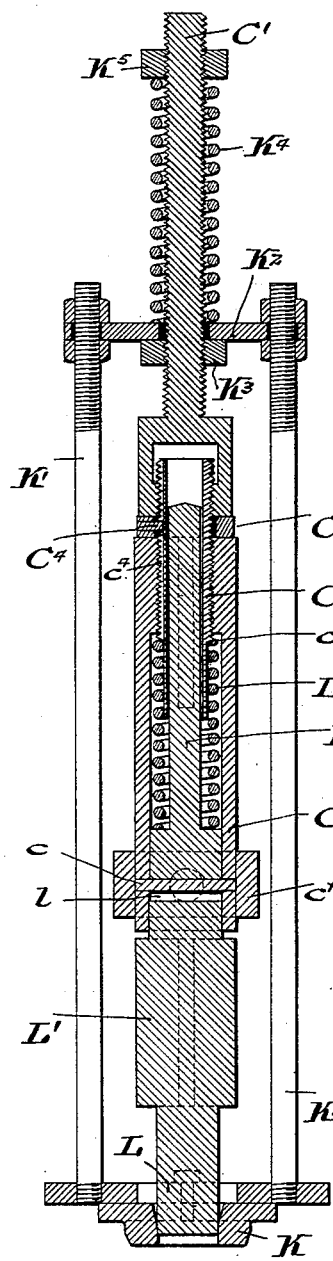
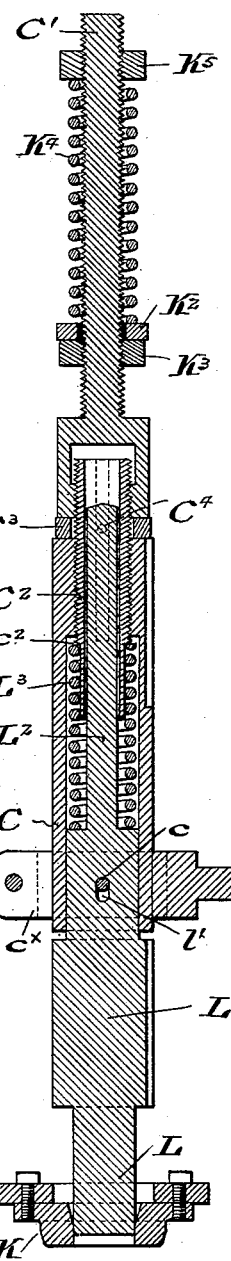
WITNESSES:
E. L. Fullerton.
F. C. Morley.
INVENTOR:
WILBUR FETTERS,
By A. E. Paige, Atty.

(No Model.) 5 Sheets—Sheet 5.

W. FETTERS.
GLASS PRESSING MACHINE.

No. 602,636. Patented Apr. 19, 1898.

WITNESSES:
E. L. Fullerton.
F. C. Morley

INVENTOR:
WILBUR FETTERS,
By A. E. Paige, Atty.

UNITED STATES PATENT OFFICE.

WILBUR FETTERS, OF PHILADELPHIA, PENNSYLVANIA.

GLASS-PRESSING MACHINE.

SPECIFICATION forming part of Letters Patent No. 602,636, dated April 19, 1898.

Application filed September 20, 1897. Serial No. 652,248. (No model.)

*To all whom it may concern:*

Be it known that I, WILBUR FETTERS, of Philadelphia, in the State of Pennsylvania, have invented certain new and useful Improvements in Glass-Pressing Machines, whereof the following is a specification, reference being had to the accompanying drawings.

My invention relates to machines comprising dies or molds wherein a solid mass of glass or similar material may be pressed to a form predetermined by the shape of said molds.

As hitherto constructed machines of this class, comprising a lower stationary mold and an upper reciprocating mold, are manually operated. The lump of glass to form each article being manually cut from a mass of glass heated to a plastic condition, it is impossible to precisely predetermine the bulk of each lump. The percentage of variation of the individual lumps from the proper amount even in the hands of the most skilful workman is so great as to prevent the employment of a machine which has a stroke of invariable length. Said machines are therefore constructed so that the limit of approach of the molds is wholly under the control of the individual operator, who determines at each stroke of the movable mold by the resistance of the material when the compressing action shall cease. The length of stroke is therefore manually varied in accordance with the quantity of material interposed between the molds.

It is the object of my invention to provide a machine which shall automatically effect the variation of stroke hitherto dependent upon the skill of an experienced operator, said machine being supplied with portions of material manually clipped from the fused mass, as heretofore.

Broadly speaking, my invention comprises opposed molds automatically brought together by mechanism in which the limit of approach of the opposed molds is determined at each stroke by the amount of material inserted between them. It is obvious that a plunger thus automatically controlled may be used in connection with single lower molds manually inserted and removed after each stroke of the plunger, as such lower molds are ordinarily used in connection with a plunger which is manually operated. I prefer, however, to embody such an automatic plunger in a machine which is provided with a series of molds and mechanism to shift them beneath said plunger, together with mechanism for removing the finished articles from the molds, without removing the latter from their position in the machine.

Figure 2:
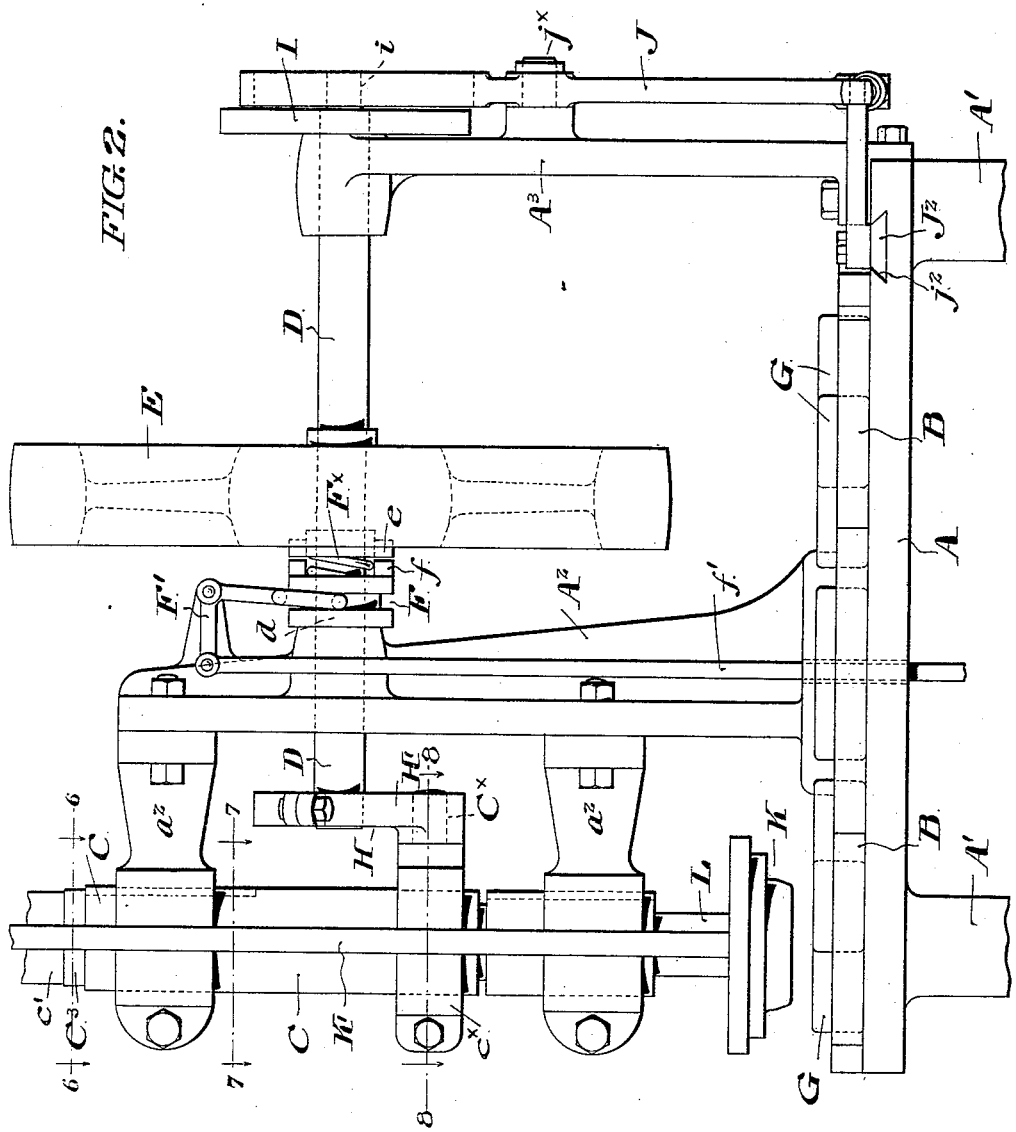
Figure 6:
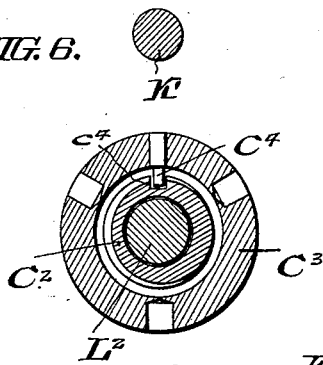
Figure 7:
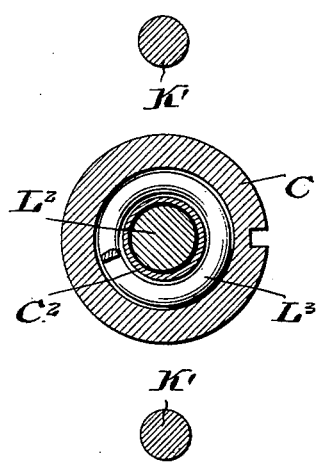
Figure 8:
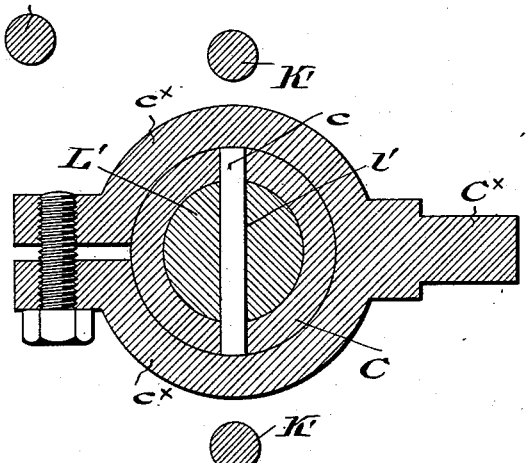
Figure 9:
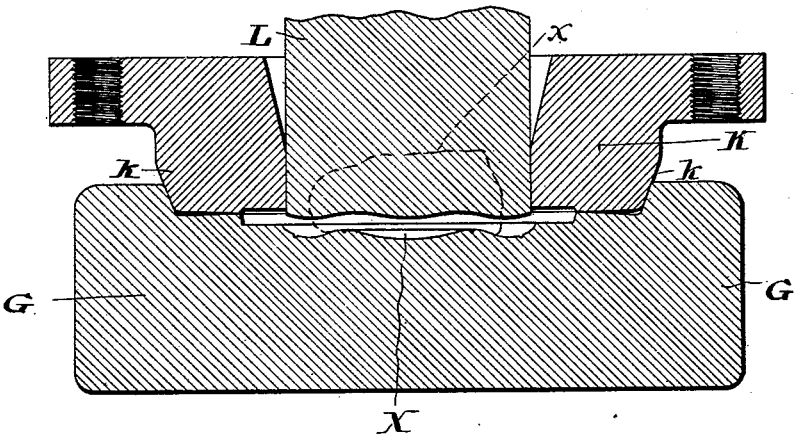

In the drawings, Figure 1 is a plan view of a machine, showing a convenient embodiment of my invention. Fig. 2 is a side elevation of said machine. Fig. 3 is an end elevation of said machine. Fig. 4 is a vertical sectional view of the plunger on the line 4 4 of Fig. 1. Fig. 5 is a vertical sectional view of the plunger on the line 5 5 of Fig. 1. Figs. 6, 7, and 8 are horizontal sectional views of the plunger on the respective lines 6 6, 7 7, and 8 8 in Fig. 2. Fig. 9 is a sectional view on the same plane as Fig. 5, showing the position of the dies at the limit of their approach. Fig. 10 shows a side elevation of the lower die and its pivotal connection to the machine. Figs. 11 and 12 show convenient means for tilting the lower die to discharge an article pressed therein. Fig. 13 shows a modified pivotal support for said lower die. Figs. 14 and 15 are respective plan and side elevations of a modified portion of the die-plunger.

In said figures, A is the bed-plate of the machine, provided with suitable legs A' A'. An annular die-carrier B is mounted for rotation upon said bed, surrounding the central boss $a$ of the latter, upon which is mounted a standard $A^2$, which serves to support the plunger C by the brackets $a^2 a^3$, in which said plunger is adapted to reciprocate. The driving-shaft D is mounted in suitable bearings in said standard $A^2$ and in the standard $A^3$, fixed at the edge of the bed A.

The driving-shaft D is conveniently rotated by means of the pulley E, which is loosely mounted upon said shaft and rotatively engaged therewith, at the will of the operator, by means of the clutch F. The means for driving the shaft D is not of the essence of my invention. I have, however, shown a well-known type of clutch, comprising projections $f$, adapted to engage corresponding projections $e$ upon the pulley E. Said clutch F, being keyed upon the shaft D, as indicated at $d$, may be conveniently shifted into engagement with the loose pulley E, against the pressure of the releasing-spring F$^\times$, by means of the bell-crank lever F', mounted upon the standard A$^2$ and provided with a link $f'$ to connect with an operating-treadle or similar device.

As shown in Fig. 1, the die-carrier B contains eight dies G, mounted in sockets $b$. Each of said dies is pivoted in its socket, as indicated at $g\ g$. Said dies G do not, however, rest upon their pivots in the carrier B, but upon the bed A, which supports them against the downward thrust of the plunger C, as they are successively shifted beneath and receive the impact of the latter.

The plunger C is reciprocated by means of the eccentric H, which is fixed upon one extremity of the shaft D, as shown in dotted lines in Fig. 3. Said eccentric H is provided with a strap H', pivotally engaged upon the stud C$^\times$, which is adjustably secured upon said plunger C by means of the clamp-ring $c^\times$. Said eccentric H serves to positively and uniformly raise and lower the plunger C with each rotation of the shaft D, means hereinafter described being, however, interposed between said positively-actuated portion of the plunger C and the plunger-mold, whereby the operative stroke of the latter is automatically varied, as aforesaid.

The die-carrier B is shifted in consonance with the reciprocation of the plunger C by means of the eccentric I, mounted upon the other extremity of the shaft D, the roller-pin $i$ of said eccentric being engaged in the slot $j$ of the lever J, which is fulcrumed at $j^\times$ upon the standard A$^3$. The lower extremity of said lever J is connected by an adjustable link J' with a slide J$^2$, which is mounted for reciprocation in the slideway $j^2$ in the bed-plate A. Said slide is provided with a pawl J$^3$, which is held by the spring $j^3$ against the periphery of the die-carrier B, the latter being provided with eight notches B$^\times$, adapted to be engaged by said pawl. The stroke of the pawl J$^3$ being somewhat in excess of the distance between adjoining notches B$^\times$ the parts just described are so related that in each backward stroke of said pawl it engages with one of the notches B$^\times$ and by its forward stroke rotates the die-carrier B, so that one of said dies is centrally located beneath the plunger C, as shown in Fig. 5.

The relation of the two eccentrics H and I, as shown in dotted lines in Fig. 3, is such that the die-carrier B is at rest during the downward operative portion of the stroke of said plunger C and is rotated while the latter is in its upper inoperative position.

Referring now to Figs. 4 to 9, inclusive, I have applied the letter C to that portion of the plunger which is positively actuated by means of the eccentric H and its connected strap H'. As best shown in Fig. 8, the stud C$^\times$ is adjustably secured upon the plunger C by means of the clamp-ring $c^\times$, so that the position of said plunger may be adjusted with relation to the eccentric H in accordance with the form of dies used in the machine. With the form of dies which I have illustrated in section in Fig. 9 the machine is adapted to make disks such as are used in fruit-jar tops. I do not, however, desire to limit myself to such a construction, as it is obvious that other forms of dies may be provided and the movement of the plunger C adjusted in accordance therewith.

In the manufacture of the articles aforesaid I prefer to use in conjunction with the mold G an annular mold K and a cylindrical mold L, concentrically mounted therein and operatively connected with the positively-actuated portion C of the plunger as follows:

It is desirable that the annular die or mold K be first brought into contact with the lower die or mold G, with the die L in such relation therewith as shown in Figs. 4 and 5. The conical periphery $k$ of said die K serves to center the latter in a similar-shaped socket in the die G. As shown in Fig. 9, said molds are so shaped that a tight joint is made at the edge of the cavity X between said molds to prevent the escape of the glass when compressed. The lump of glass which is to be compressed rests upon the lower die G, as indicated at $x$ in said figure, and is thus inclosed by said annular mold K. The plunger-die L then descends into the position shown in Fig. 9, compressing said lump $x$ into the interstices of the space X, thus forming the completed article.

To effect the movement of the molds or dies K and L, the former is mounted upon a yoke K', the cross-bar K$^2$ of which encircles the upper threaded stem C' upon the plunger C. As hereinafter described, this threaded stem C' is adjustable with respect to the plunger C; but for purposes of operation said two parts are relatively fixed. The normal lower position of the die K and its yoke K' with respect to the plunger C is determined by the position of the nut K$^3$, which is adjustable upon the threaded stem C' of said plunger. The spring K$^4$ serves to normally maintain said yoke and die in said normal lower position. The pressure of said spring K$^4$ is, however, determined by the adjustable nut K$^5$, which is also fixed upon said threaded stem C' and serves as an abutment for the upper end of said spring.

The parts just described are so related that when the plunger C is at the upper extremity of its stroke the distance between the molds K and G is less than the stroke of the eccentric H and plunger C. It is therefore obvious that as the eccentric H rotates said molds K and G will be maintained in contact during a predetermined portion of the stroke of said eccentric, the spring K$^4$ yielding under a certain pressure, predetermined by the adjustment of the nut K$^5$, to permit of the positive movement of the plunger C.

The die L is mounted upon the extremity of the plunger L', the latter being mounted to reciprocate within the plunger C, the limits of the relative movement of the two plungers C and L' being determined by the slot $l'$ in the latter, in which is engaged the pin $c$, which is fixed in the plunger C. The upper extremity of the plunger L' is reduced in diameter, as indicated at $L^2$, and surrounded by the spring $L^3$, which normally maintains the plunger L' at the lower limit of its movement relative to the plunger C, as shown in Figs. 4 and 5.

The pressure of the spring $L^3$ may be varied by longitudinal adjustment of the threaded sleeve $C^2$, having the abutment $c^2$ for said spring. The aforesaid adjustment of the sleeve $C^2$ with respect to the plunger C, with which it is in threaded engagement, is conveniently effected by the collar-wrench $C^3$, (best shown in Fig. 6,) said wrench being rotatively engaged with the sleeve $C^2$ by means of the key $C^4$, entered in the keyway $c^4$ in said sleeve. As stated, the position of said sleeve $C^2$, with its abutment-shoulder $c^2$, with respect to the plunger C determines the pressure with which the spring $L^3$ maintains the plunger L' in its lower normal position with respect to said plunger C. Its adjustment is, however, effected before the machine is placed in operation, the sleeve being securely clamped in its adjusted position by means of the threaded socket $c'$ of the stem $C'$.

From the foregoing description of construction and operation of the movable mold members and their actuating mechanism it is manifest that although the machine may be continuously operated from an eccentric having a uniform stroke, yet the effective operative stroke of the dies or molds is not dependent upon the skilful manipulation of an experienced operator, but is automatically determined by the resistance of the material compressed between said dies, the springs $K^4$ and $L^3$ yielding in accordance with said resistance.

I find it desirable in the manufacture of some articles to so construct the elastic medium of the plunger that it shall yield during the compressing action to a certain extent, as aforesaid, and shall then continue to yield only under greater pressure or resistance. A convenient construction to attain this result is as follows:

In Figs. 14 and 15 I have shown modified means connective of the plungers C and L' differing from that described in connection with Figs. 4 and 5 in that the downward stroke of the plunger C not only compresses the spring $L^3$ directly by the relative movement of said plunger L' within the plunger C, but after certain portion of its stroke the direct or primary compression is supplemented by a secondary compression, the parts being arranged as follows: The spring $L^3$, which surrounds stem $L^2$ of the plunger L', rests upon the loose collar $L^4$. Said collar $L^4$ remains in fixed relation with the plunger L' during the first portion of the compressing-stroke of said plunger, but is raised from its seat at the extremity of said stroke by means of the toggle-levers $L^5$, which are in said portion of the stroke operated by the descent of the pin $c$ of the plunger C in the slot $l'$. Said toggle-levers are provided with seats $l^5$ and $l^6$ in the plunger L' and the collar $L^4$, respectively, said seats serving to prevent the lateral displacement of the extremities of said levers. It is obvious that by the operation of said levers $L^5$ the spring $L^3$ is not only compressed to the extent of the relative movement of the plungers C and L', but this movement is supplemented by the movement of said levers in a longitudinal direction with respect to said plungers, the effect being to compress the material between the molds with greater force at the extremity of the stroke of the plunger C.

Referring now to Figs. 10, 11, and 12, it will be seen that the pivotal projections $g$ upon the molds G are seated in suitable depressions $b'$ in the mold-carrier B. As above described, said molds are not suspended upon said pivotal projections, but rest upon the surface of the bed-plate A. Each of the die-sockets $b$ is provided with a spring $b^2$, secured to the under side of the carrier B and normally disposed in the position shown in Fig. 11. When, however, said carrier B shifts the dies G successively over the opening $A^\times$ in the table A, said springs $b^2$ serve to tilt their respective dies G, as indicated in Fig. 12, thus discharging the pressed articles upon an inclined table $A^5$, from whence they may be removed as desired. The further traverse of the carrier B causes the dies G to ride over the edge $a^\times$ of the opening $A^\times$ in the bed-plate A, and thus restores them to their normal position. As shown in Fig. 13, said dies G may be pivoted upon adjustable cone-screws $g'$, mounted in the carrier B instead of upon the cylindrical projections $g$ of the molds G.

In the operation the die-carrier B rotates in the direction of the arrow in Fig. 1, and lumps of glass or similar material are clipped from the mass and fall upon the dies G, as indicated at $x\ x$ in said figure, as said dies are shifted successively in front of the operator. As above described, said dies G, containing said lumps $x$, pass successively beneath the plunger C, &c., and are pressed. The opening $A^\times$ is preferably located as indicated in dotted lines upon Fig. 1, so that after compression sufficient time elapses for the pressed articles to become partially cooled before they are discharged from the machine. Although the operation of the machine is intended to be continuous, it is desirable to provide a clutch, as above described, whereby the operator may instantly stop it if the cycle of operation is accidentally interrupted.

I am aware that in this art rotary tables or dials which serve to shift molds or dies beneath a manually-operated plunger have been used for many years. I therefore do not desire to broadly claim this feature of my invention.

So far as I am aware it is new in this art to provide an elastic medium between a movable die or mold and its actuating mechanism. I therefore do not desire to limit myself to the precise construction which I have shown and described, as it is obvious that various modifications may be made without departing from the spirit of my invention.

I claim—

1. In a glass-press the combination with a fixed bed-plate, of a mold-carrier mounted to rotate upon said bed-plate, mechanism to intermittently rotate said carrier, a series of sockets in said carrier, a series of molds pivoted in said sockets, and resting upon said bed-plate, a discharge-opening in said bed-plate, means to tilt said pivoted molds when over said discharge-opening, means to return said molds to normal position, a positively-actuated plunger, a second plunger in telescopic relation with said first plunger, an elastic medium between said two plungers, and a mold upon said second plunger adapted to successively register with said pivoted molds, substantially as set forth.

2. In a glass-press the combination with a fixed bed-plate, of a mold-carrier mounted to rotate upon said bed-plate, mechanism to intermittently rotate said carrier, a series of sockets in said carrier, a series of molds pivoted in said sockets, and resting upon said bed-plate, a discharge-opening in said bed-plate, means to tilt said pivoted molds, when over said discharge-opening, means to return said molds to normal position, a positively-actuated plunger, a mold comprising two concentrically-related relatively-movable members, adapted to successively register with said pivoted molds, and separate elastic mediums connective of said two mold members and said positively-actuated plunger, substantially as set forth.

3. In a glass-press, the combination with a fixed bed-plate, of a mold-carrier mounted for movement upon said bed-plate, a mold entered in said carrier adapted to rest upon said fixed bed-plate, means to shift said mold-carrier, and a second mold adapted to coöperate with the mold in said carrier, substantially as set forth.

4. In a glass-press, the combination with a fixed bed-plate, of a mold-carrier mounted for movement upon said bed-plate, a mold pivoted in said carrier, and adapted to rest upon said bed-plate, means to shift said mold-carrier, an opening in said bed-plate, means to tilt said pivoted mold when in registry with said bed-plate opening, and a second mold adapted to coöperate with said pivoted mold, substantially as set forth.

5. In a glass-press, the combination with a fixed bed-plate, of a mold-carrier mounted for rotation upon said bed-plate, a mold pivoted in said carrier, adapted to rest upon said fixed bed-plate, means to rotate said mold-carrier, an opening in said bed-plate, means to tilt said pivoted mold when in registry with said bed-plate opening, means to return said tilted mold to normal position by the rotation of said carrier, and a second mold adapted to coöperate with said pivoted mold, substantially as set forth.

6. In a glass-press, the combination with a fixed bed-plate, of a mold-carrier mounted for movement upon said bed-plate, a mold pivoted in said carrier, means to shift said mold-carrier, an opening in said bed-plate, means to tilt said pivoted mold when in registry with said bed-plate opening, to discharge the molded article through the latter, a table $A^5$, beneath said opening, and a second mold adapted to coöperate with said pivoted mold, substantially as set forth.

7. In a glass-press, the combination with a fixed bed-plate, of a mold-carrier mounted for movement upon said bed-plate, a mold pivoted in said carrier and adapted to rest upon said bed-plate, means to shift said mold-carrier, an opening in said bed-plate, means to tilt said pivoted mold when in registry with said bed-plate opening, to discharge the molded article through the latter, means to return said mold to normal position by the movement of said mold-carrier, a table $A^5$, beneath said opening, and a second mold adapted to coöperate with said pivoted mold, substantially as set forth.

8. In a glass-press, the combination with a fixed bed-plate, of a mold-carrier mounted for rotation upon said bed-plate, a mold pivoted in said carrier and adapted to rest upon said fixed bed-plate, peripheral notches in said carrier, a reciprocatory pawl to engage said notches and shift said carrier, an opening in said bed-plate, means to tilt said pivoted mold when in registry with said bed-plate opening, to discharge the molded article through the latter, means to return said mold to normal position by the movement of said mold-carrier, and a second mold adapted to coöperate with said pivoted mold, substantially as set forth.

9. In a glass-press, the combination with a positively-actuated plunger C, of a plunger L', mounted for relative movement upon the first-named plunger, a spring $L^3$, intermediate of said two plungers, and toggle-levers $L^5$ connective of said two plungers, substantially as set forth.

10. In a glass-press, a hollow plunger C, mounted for reciprocation, a second plunger L', mounted for reciprocation within said plunger C, a spring $L^3$, mounted within the plunger C, to bear upon the plunger L', and a pin $c$, entered through said plungers to limit their relative movement, substantially as set forth.

11. In a glass-press, a hollow plunger C, mounted for reciprocation, a second plunger L', mounted for reciprocation within said plunger C, a spring $L^3$, mounted within the plunger C, to bear upon the plunger L', a pin $c$, entered through said plungers to limit their relative movement, and a screw-threaded sleeve $C^2$, to adjust the pressure of said spring, substantially as set forth.

12. In a glass-press, a hollow plunger C, mounted for reciprocation, a second plunger L', mounted for reciprocation within said plunger C, a spring $L^3$, intermediate of said two plungers, a pin $c$, to limit the relative movement of said plungers, a threaded extension C', upon the upper extremity of said plunger C, a yoke $K^2$, mounted upon said extension C' and provided with an adjustable spring $K^4$, and rods K', connecting said yoke $K^2$ with the mold K, at the lower extremity of said plunger L', substantially as set forth.

13. In a glass-press, a hollow plunger C, mounted for reciprocation, a second plunger L', mounted for reciprocation within said plunger C, a spring $L^3$, intermediate of said two plungers, a pin $c$, to limit the relative movement of said plungers, a threaded sleeve $C^2$, to adjust the pressure of said spring $L^3$, a threaded extension C', upon the upper extremity of said plunger C, a yoke $K^2$, mounted upon said extension C', and provided with an adjustable spring $K^4$, and rods K', connecting said yoke $K^2$, with the mold K, at the lower extremity of said plunger L', substantially as set forth.

14. In a glass-press, a hollow plunger C, mounted for reciprocation, a second plunger L', mounted for reciprocation within said plunger C, a spring $L^3$, intermediate of said two plungers, a pin $c$, to limit the relative movement of said plungers, a sleeve $C^2$, in threaded engagement with the plunger C, the collar-wrench $C^2$, in engagement with said sleeve, a threaded extension C', upon the upper extremity of said plunger C, in threaded engagement with the sleeve $C^2$, a yoke $K^2$, mounted upon said extension C', and provided with an adjustable spring $K^4$, and rods K', connecting said yoke $K^2$, with the mold K, at the lower extremity of said plunger L', substantially as set forth.

WILBUR FETTERS.

Witnesses:
EPHRAIM ROGERS,
GEO. E. POTTS.